(12) United States Patent
Chen

(10) Patent No.: US 10,278,536 B2
(45) Date of Patent: May 7, 2019

(54) STEAM SHOW DEVICE FOR BEVERAGE MAKING APPARATUS

(71) Applicant: CHOUKI INTERNATIONAL COMPANY LTD., Taipei (TW)

(72) Inventor: Kun-Chih Chen, Taipei (TW)

(73) Assignee: CHOUKI INTERNATIONAL COMPANY LTD., Taipei (TW)

( * ) Notice: Subject to any disclaimer, the term of this patent is extended or adjusted under 35 U.S.C. 154(b) by 526 days.

(21) Appl. No.: 15/169,338

(22) Filed: May 31, 2016

(65) Prior Publication Data

US 2017/0340163 A1   Nov. 30, 2017

(51) Int. Cl.
*A47J 31/44*   (2006.01)
*A47J 31/00*   (2006.01)
*A47J 31/54*   (2006.01)
*A47J 31/40*   (2006.01)

(52) U.S. Cl.
CPC ............ *A47J 31/54* (2013.01); *A47J 31/401* (2013.01); *A47J 31/44* (2013.01)

(58) Field of Classification Search
CPC .................................. A47J 31/44; A47J 31/54
See application file for complete search history.

(56) References Cited

U.S. PATENT DOCUMENTS

| | | | | |
|---|---|---|---|---|
| 3,066,598 A * | 12/1962 | Baldioli | ............. | A47J 31/0576 99/285 |
| 3,226,528 A * | 12/1965 | Martin | ................. | A47J 31/053 116/101 |
| 3,795,788 A * | 3/1974 | Perucca | .................. | A47J 31/36 392/396 |
| 4,398,454 A * | 8/1983 | Lambros | ............... | A47J 27/212 126/388.1 |
| 4,667,584 A * | 5/1987 | Koyama | ............... | A47J 31/106 99/280 |
| 5,188,019 A * | 2/1993 | Vahabpour | ............. | A47J 31/18 137/606 |
| 7,813,628 B2 * | 10/2010 | Haan | ....................... | F22B 1/288 392/397 |
| 9,723,947 B2 * | 8/2017 | Garvey | ................. | A47J 31/542 |
| 2006/0150821 A1 * | 7/2006 | Paul | ...................... | A47J 31/401 99/279 |
| 2012/0128338 A1 * | 5/2012 | Garvey | ................. | A47J 31/542 392/465 |

(Continued)

FOREIGN PATENT DOCUMENTS

WO   WO-2015041429 A1 *   3/2015   .............. A47J 31/10

*Primary Examiner* — Dana Ross
*Assistant Examiner* — Lawrence H Samuels
(74) *Attorney, Agent, or Firm* — Chun-Ming Shih

(57) ABSTRACT

A steam show apparatus is provided with a water boiler; a heater for heating water in the water boiler to hot water and steam; a dispenser for dispensing hot water fed from the water boiler; an electromagnetic valve for brewing configured to open to allow hot water to enter a cup via the dispenser so as to make a beverage by mixing with material in the cup; at least one steam line each including an outlet; a steam controller co-activates with the electromagnetic valve for brewing so that in a beverage making process, steam in the steam line flows out of the outlet as a steam show; and a CPU for controlling an amount of the steam sprayed out of the outlet. It has an effect similar to dancing fountain.

5 Claims, 5 Drawing Sheets

(56) References Cited

U.S. PATENT DOCUMENTS

| | | | |
|---|---|---|---|
| 2013/0220136 A1* | 8/2013 | De Jong | A47J 27/2105 99/285 |
| 2015/0135966 A1* | 5/2015 | Hulett | A47J 31/404 99/289 R |
| 2016/0183714 A1* | 6/2016 | Hwang | A47J 31/10 99/285 |

* cited by examiner

STEAM SHOW DEVICE FOR BEVERAGE MAKING APPARATUS

BACKGROUND OF THE INVENTION

1. Field of the Invention

The invention relates to steam show devices and more particularly to a steam show device in cooperation with a beverage making apparatus having an effect similar to dancing fountain while customers waiting for beverage being made.

2. Description of Related Art

Beverage making apparatuses are provided for making coffee, tea or the like. A conventional beverage making apparatus is shown in FIG. 8 and comprises a pump 80, a water boiler 81, a container 82 and a dispenser 83. The pump 80 is used to pump cold water into the water boiler 81. A water level indicator 84 can indicate level of water in the water boiler 81 and either activate or deactivate a first electromagnetic valve 95 based on the detected water level. And in turn, the first electromagnetic valve 95 is open or closed in order to allow water to flow from the pump 80 to the water boiler 81 or not. A steam pressure gauge 85 communicates with the water boiler 81 and is used to activate or deactivate a heater 86 based on steam pressure of the water boiler 81 measured by the steam pressure gauge 85. The activated heater 86 can heat water in the water boiler 81 until the steam pressure reaches, for example, 1.2 bar. A portion of water in the water boiler 81 is heated to hot water of 120° C. and the remaining portion of water therein is further heated to steam.

In a beverage making operation the first electromagnetic valve 95 is open and the pump 80 is activated. Thus, cold water from an external water source is pumped through a feed water line 88 by the pump 80. The pressurized water flows to the container 82 via a safety valve 89 and a flow meter 90. Water in the container 82 is heated by the water boiler 81. The hot water then flows to the dispenser 83 via a hot water line 91. A second electromagnetic valve 87 is open to allow the hot water to leave the dispenser 83 to pour into a cup 94 filled with coffee or tea to be brewed. The second electromagnetic valve 87 is closed and the pump 80 are deactivated when a predetermined amount of water flowing through the feed water line 88 is measured by the flow meter 90, i.e., a predetermined amount of hot water being poured into the cup 94.

In a standby state of the beverage making apparatus, a portion of hot water in the container 82 is evaporated to become steam which flows to the dispenser 83 via the hot water line 91. The steam loses its heat and becomes water which flows to the container 82 via a reflow line 93.

Moreover, a steam line 96 is connected to the water boiler 81. A pressure regulator 97 and a third electromagnetic valve 98 are provided on the steam line 96 for controlling steam flowing out of the water boiler 81. In detail, after making beverage, a user may open the third electromagnetic valve 98 to allow steam to flow out of the water boiler 81 and open the pressure regulator 97 to control the steam flowing through the steam line 96.

However, as far as the present inventor is aware, there are no further applications of the conventional beverage making apparatus in addition to the hot water dispensing function discussed above.

Thus, the need for improvement still exists.

SUMMARY OF THE INVENTION

It is therefore one object of the invention to provide a steam show apparatus comprising a water boiler; a heater for heating water stored in the water boiler to hot water and steam; a dispenser for dispensing hot water fed from the water boiler; an electromagnetic valve for brewing configured to open to allow hot water to enter a cup via the dispenser so as to make a beverage by mixing with material in the cup; at least one steam line each including an outlet; a steam controller configured to co-activate with the electromagnetic valve for brewing so that in a beverage making process, steam in the steam line flows out of the outlet as a steam show; and a central processing unit (CPU) for controlling an amount of the steam sprayed out of the outlet.

Preferably, further comprises a cover for containing the steam line and the steam controller, wherein the cover is provided on a top of the dispenser, and wherein the outlet is provided on a top surface of the cover.

Preferably, the steam controller is a proportional valve provided on the steam line, wherein the steam controller is configured to open or close the steam line, and wherein the steam controller is configured to adjust amount of steam sprayed out of the outlet.

Preferably, further comprises a light source controlled by the CPU, the light source being capable of emitting light rays to illuminate steam sprayed out of the outlet during the steam show.

Preferably, the light source includes a plurality of projector lamps each being capable of emitting light having a different color.

Preferably, further comprises a plurality of branches connected to the steam line, wherein the steam controller includes a plurality of sets of a branch, a throttle, and an electromagnetic valve for steam show, and wherein the throttle is manually adjusted to operate in one of a plurality of different flow rates so that steam flows of different flow rates pass through the corresponding branch, the electromagnetic valve for steam show opens or closes the corresponding branch, and the CPU controls opening or closing of the electromagnetic valve for steam show.

BRIEF DESCRIPTION OF THE DRAWINGS

The invention, as well as its many advantages, may be further understood by the following detailed description and drawings in which.

DETAILED DESCRIPTION OF THE INVENTION

Figure 3:
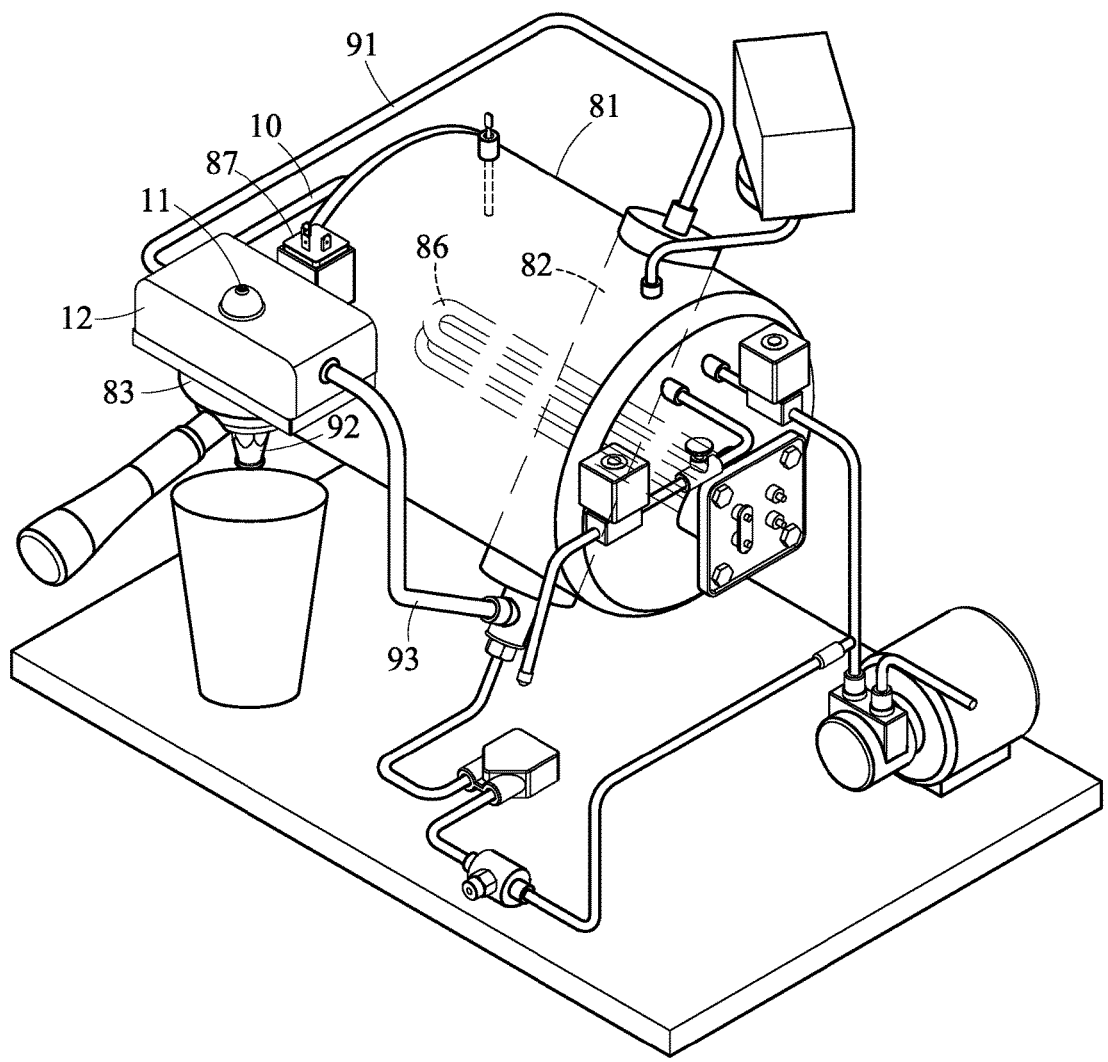
FIG. 3 is a perspective view of the steam show device incorporated into a beverage making apparatus.
Figure 8:
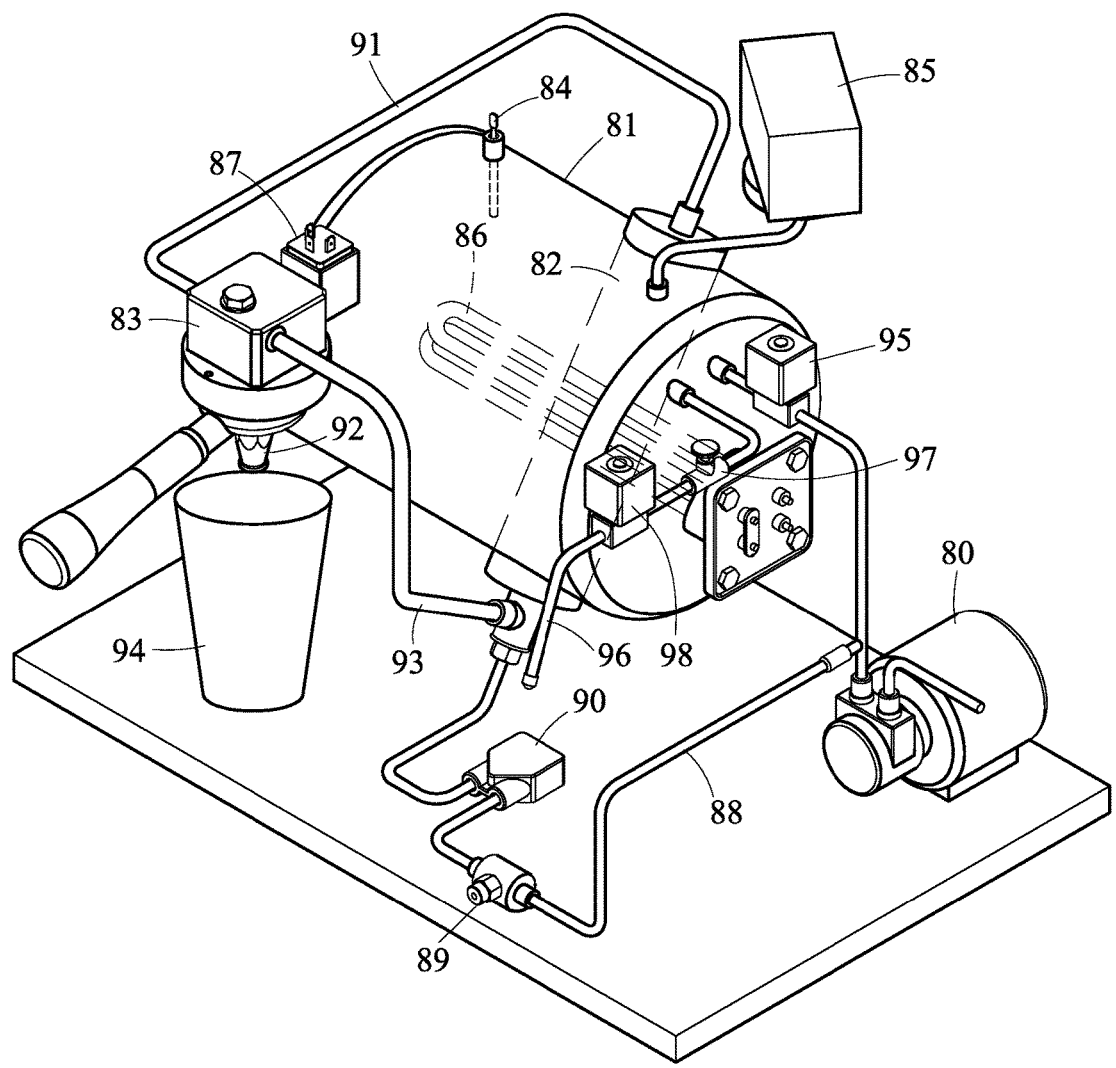
FIG. 8 is a perspective view of a conventional beverage making apparatus.

The steam show device of the invention is adapted to cooperate with and incorporate into a conventional beverage making apparatus so that a steam show can be carried out by using steam while making a beverage. Thus, customers may watch the steam show while waiting for the making of a beverage. The beverage making apparatus shown in FIG. 3 is the same as that shown in FIG. 8. It is envisaged by the invention that the steam show device of invention can cooperate with and be incorporated into any of other conventional beverage making apparatuses.

Referring to FIG. 3, a steam show device in cooperation with a beverage making apparatus used by the invention is shown. The beverage making apparatus comprises a water boiler 81, a heater 86 for heating water in the water boiler 81 to hot water and steam, a dispenser 83 for dispensing hot water fed from the water boiler 81 via a container 82 and a hot water line 91, and an electromagnetic valve 87 for brewing which can be open to allow hot water to enter a cup 92 via the dispenser 83 so as to make a beverage by mixing with coffee, tea or the like. Steam trapped in the dispenser 83 may lose its heat to become water which in turn flows to the container 82 via a reflow line 93.

Other components such as the flow meter, the pressure regulator, the safety valve, piping, etc. are not described further because they are well known in the art and already discussed in the background.

Figure 1:
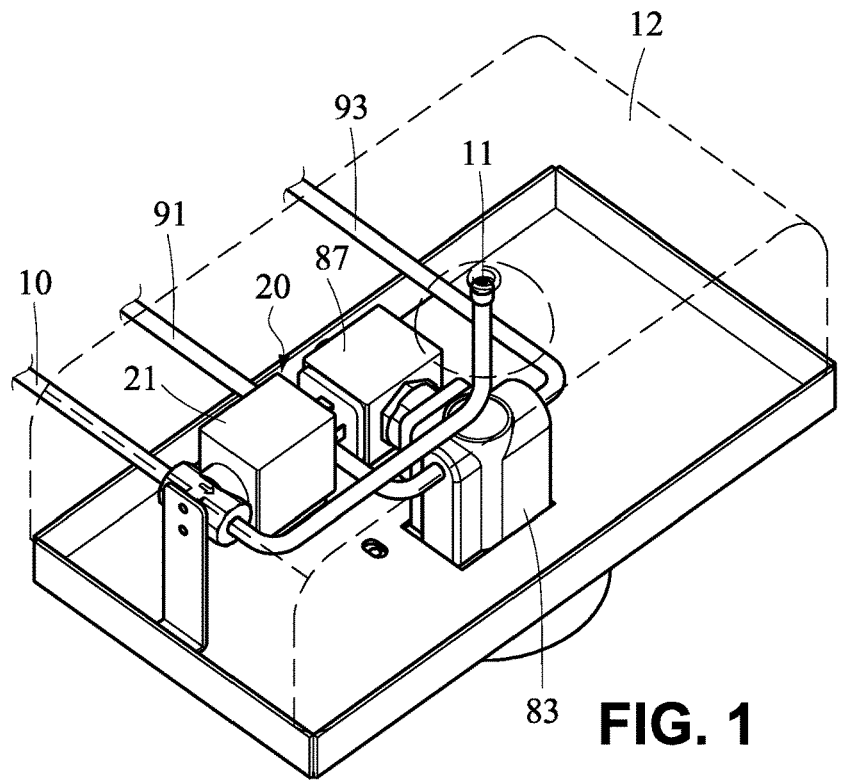
FIG. 1 is a perspective view of a steam show device according to a first preferred embodiment of the invention in cooperation with a beverage making apparatus, a cover removed to show internal components.
Figure 2:
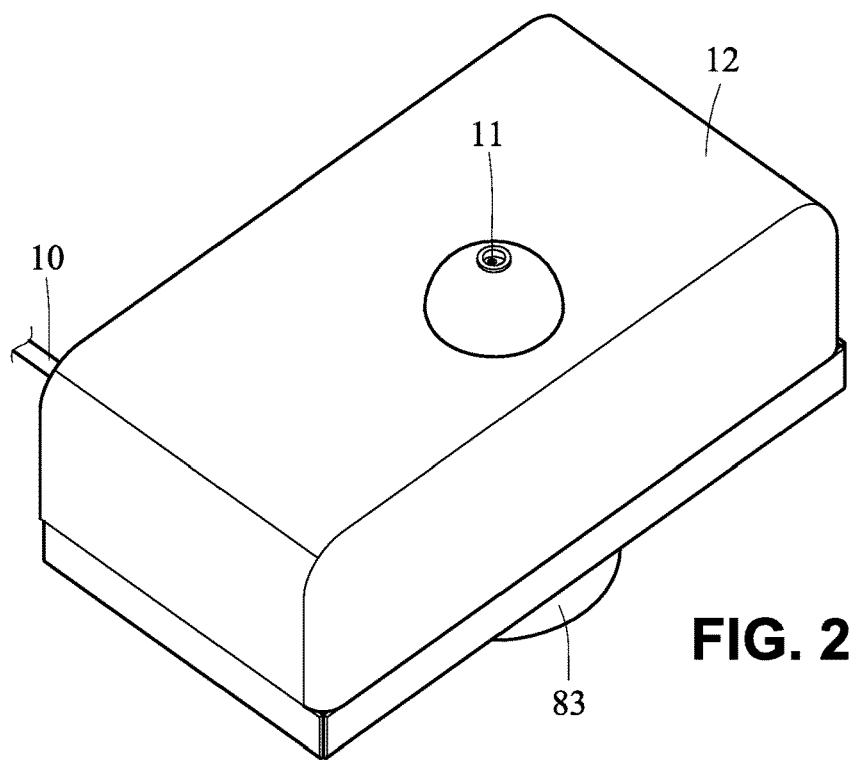
FIG. 2 is a perspective view of the steam show device with the cover mounted thereon.

Referring to FIGS. 1 to 3, a steam show device in accordance with a first preferred embodiment of the invention in cooperation with a beverage making apparatus is shown. The steam show device comprises a steam line 10 for flowing steam from the water boiler, an outlet 11 at one end of the steam line 10, and a steam controller 20. In a beverage making process, steam in the steam line 10 flowing out of the outlet 11 as a steam show. The steam controller 20 can adjust amount of output steam in the steam show by programming. As a result, it has an effect similar to dancing fountain.

As shown in FIGS. 2 and 3 specifically, the steam show device further comprises a cover 12 for containing the steam line 10 and the steam controller 20. The cover 12 is provided on a top of the dispenser 83 and the outlet 11 is provided on a top surface of the cover 12. The steam controller 20 is implemented as a proportion valve 21 disposed on the steam line 10. The proportion valve 21 can open or close the steam line 10 or adjust flow rate of the steam.

The proportion valve 21 is commercially available. The proportion valve 21 acts to control flow direction, flow rate and pressure in response to input signals. The proportion valve 21 has a proportional electromagnet rather than a manual hand wheel. The proportional electromagnet is different from conventional direct current based electromagnet which has on and off positions. In the on position (i.e., attraction), there is no gap in the magnetic path. The proportional electromagnet may exert a force or displace in proportion to electric current passing through. There is a gap in the magnetic path of the proportional electromagnet. The proportional electromagnet includes poles, coils, cover and magnets. A magnetic field is created when current passes through the coils. Magnetic lines pass through magnets, gap and poles to form a magnetic loop. The poles may attract the magnets and the attraction force varies as distance between the pole and the magnet changes. The magnets of the proportional electromagnet may operate in this working range. The proportional electromagnet, as a replacement of the hand wheel, can effect a steam flow rate change in proportion to input current. The conventional proportional electromagnet used by the invention can effect a change of steam flowing out of the steam line 10 by changing current passing through the coils.

Figure 4:
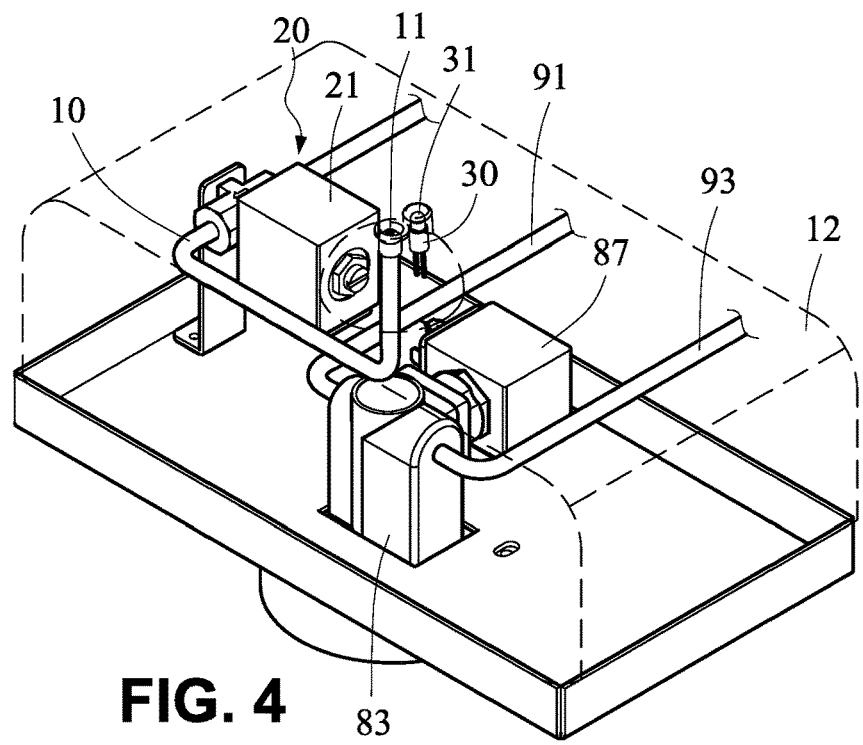
FIG. 4 is a view of a steam show device according to a second preferred embodiment of the invention in cooperation with a beverage making apparatus, a cover removed to show internal components.
Figure 5:
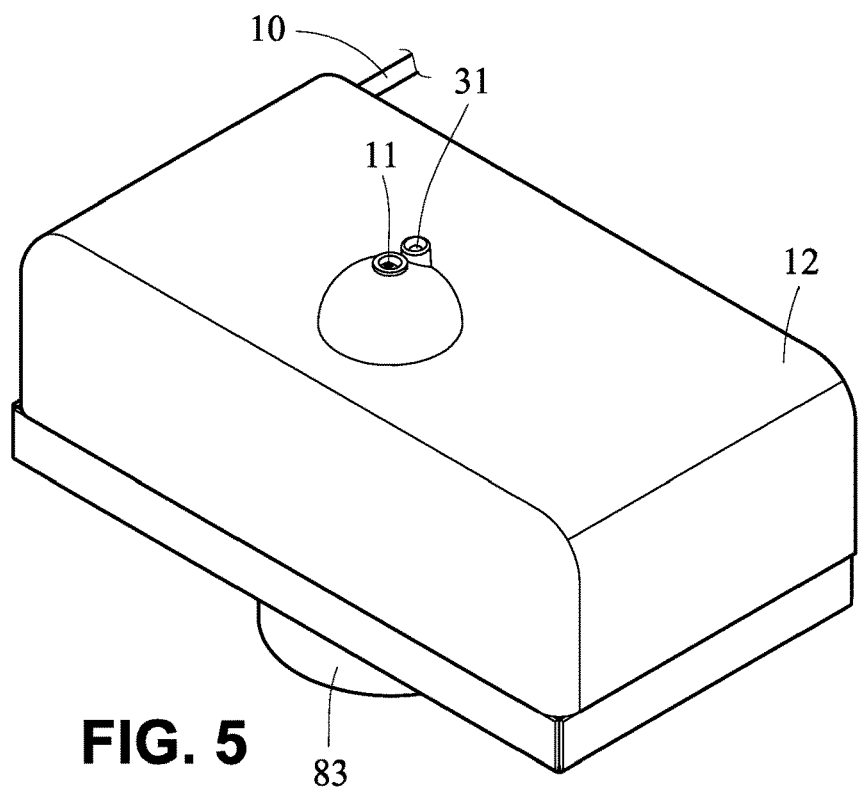
FIG. 5 is a perspective view of the steam show device of FIG. 4 with the cover mounted thereon.

Referring to FIGS. 4 and 5, a steam show device in accordance with a second preferred embodiment of the invention in cooperation with a beverage making apparatus is shown. The characteristics of the second preferred embodiment are substantially the same as that of the first preferred embodiment except the following: A light source 30 is provided to emit light rays to illuminate steam spraying out of the outlet 11 during steam show. The light source 30 can be implemented as light emitting diodes (LEDs) mounted in a bossed hole 31 projecting out of the top of the cover 12. The bossed hole 31 is adjacent to the outlet 11. The light source 30 includes a plurality of projector lamps each being capable of emitting light having a different one of colors. The team spraying out of the outlet 11 is illuminated by the multi-colored light rays emitted by the light source 30. Thus, it has an effect similar to a colorful dancing fountain.

Figure 6:
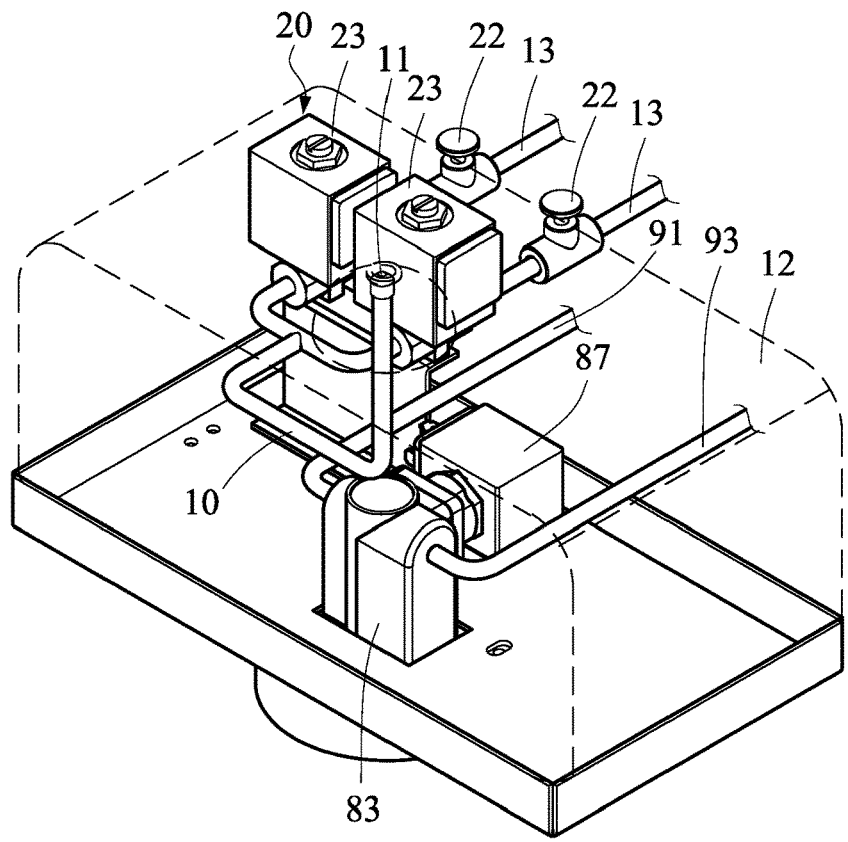
FIG. 6 is a view of a steam show device according to a third preferred embodiment of the invention in cooperation with a beverage making apparatus, a cover removed to show internal components.

Referring to FIG. 6, a steam show device in accordance with a third preferred embodiment of the invention in cooperation with a beverage making apparatus is shown. The characteristics of the third preferred embodiment are substantially the same as that of the first preferred embodiment except the following: The proportional valve of FIG. 1 is replaced by a plurality of throttles and electromagnetic valves. Further, there are several branches 13 connected to the steam line 10. The steam controller 20 includes a plurality of sets of a branch 13, a throttle 22, and an electromagnetic valve 23 for steam show. The throttle 22 is manually adjusted to operate in one of a plurality of different flow rates so that steam flows of different flow rates may pass through the branch 13. The electromagnetic valve 23 for steam show can open or close the corresponding branch 13. The electromagnetic valve 23 for steam show of one set may co-activate with the electromagnetic valve 23 for steam show of the other set. Four different rates of steam can be sprayed out of the outlet 11 if there are two branches 12. For example, a maximum amount of steam can be sprayed out of the outlet 11 if the two electromagnetic valves 23 for steam show are open. Median or small amount of steam is sprayed out of the outlet 11 if there is only one electromagnetic valve 23 for steam show is open and it further depends on which one of the two electromagnetic valves is open. No steam flows out of the outlet 11 if both the electromagnetic valves 23 for steam show are closed. The number of different amounts of steam sprayed out of the outlet 11 is proportional to the number of the branches 13. For example, the outlet 11 can spray steam of 16 different amounts if there are four branches 13.

Figure 7:
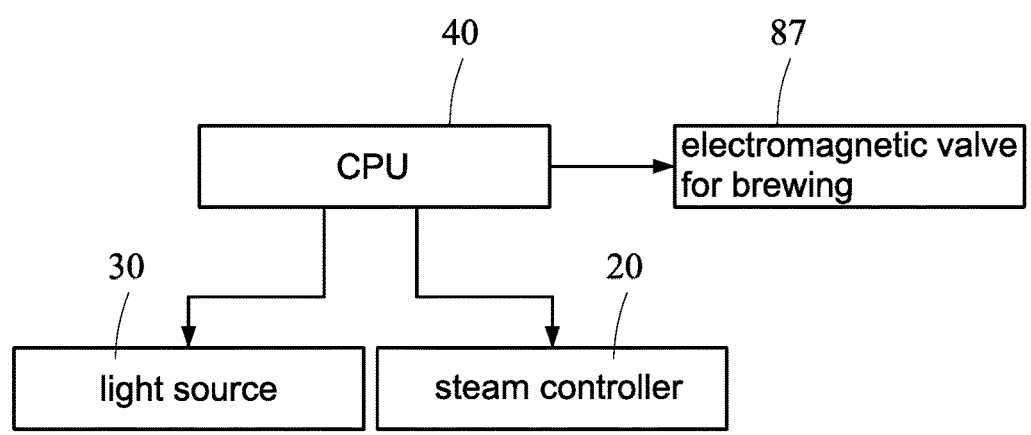
FIG. 7 is a block diagram of the steam show device and other associated components according to the invention.

Referring to FIG. 7, the steam show device further comprises a central processing unit (CPU) 40 for controlling the electromagnetic valve 87 for brewing, the steam controller 20 and the light source 30. The CPU 40 can be the CPU of the beverage making apparatus or another CPU which cooperates with the CPU of the beverage making apparatus. If the CPU 40 is the CPU of the beverage making apparatus, the automatic operation of the beverage making apparatus should be amended. In the beverage making process, the electromagnetic valve 87 for brewing is open.

Further, the CPU 40 activates both the steam controller 20 and the light source 30 to have an effect similar to dancing fountain. Thus, customers may watch the dancing fountain while waiting for beverage being made. After making beverage, the electromagnetic valve 87 for brewing is closed. And in turn, the CPU 40 deactivates both the steam controller 20 and the light source 30. The steam controller 20 is either the proportional valve 21 of FIG. 1 or the electromagnetic valve 23 for steam show of FIG. 6.

The steam show device of the invention in cooperation with a beverage making apparatus can have an effect similar to dancing fountain by using steam supplied from the water boiler of the beverage making apparatus. Thus, customers may watch the dancing fountain while waiting for beverage being made. Further, the CPU can change the amount of steam being sprayed to have an effect similar to dancing fountain by playing music and emitting a multi-color light to the steam by using a projector lamp based light source. As a result, an attractive show is presented.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A steam show apparatus comprising:
   a water boiler;
   a heater for heating water stored in the water boiler to hot water and steam;
   a dispenser for dispensing hot water fed from the water boiler;
   an electromagnetic valve for brewing configured to open to allow hot water to enter a cup via the dispenser so as to make a beverage by mixing with material in the cup;
   at least one steam line each including an outlet;
   a steam controller configured to co-activate with the electromagnetic valve for brewing so that in a beverage making process, steam in the steam line flows out of the outlet as a steam show; and
   a central processing unit (CPU) for controlling an amount of the steam sprayed out of the outlet,
   wherein the steam controller is a proportional valve provided on the steam line, wherein the steam controller is configured to open or close the steam line, and wherein the steam controller is configured to adjust amount of steam sprayed out of the outlet.

2. The steam show apparatus of claim 1, further comprising a cover for containing the steam line and the steam controller, wherein the cover is provided on a top of the dispenser, and wherein the outlet is provided on a top surface of the cover.

3. The steam show apparatus of claim 1, further comprising a light source controlled by the CPU, the light source being capable of emitting light rays to illuminate steam sprayed out of the outlet during the steam show.

4. The steam show apparatus of claim 3, wherein the light source includes a plurality of projector lamps each being capable of emitting light having a different color.

5. A steam show apparatus comprising:
   a water boiler;
   a heater for heating water stored in the water boiler to hot water and steam;
   a dispenser for dispensing hot water fed from the water boiler;
   an electromagnetic valve for brewing configured to open to allow hot water to enter a cup via the dispenser so as to make a beverage by mixing with material in the cup;
   at least one steam line each including an outlet;
   a steam controller configured to co-activate with the electromagnetic valve for brewing so that in a beverage making process, steam in the steam line flows out of the outlet as a steam show;
   a central processing unit (CPU) for controlling an amount of the steam sprayed out of the outlet; and
   a plurality of branches connected to the steam line, wherein the steam controller includes a plurality of sets of a branch, a throttle, and an electromagnetic valve for steam show, and wherein the throttle is manually adjusted to operate in one of a plurality of different flow rates so that steam flows of different flow rates pass through the corresponding branch, the electromagnetic valve for steam show opens or closes the corresponding branch, and the CPU controls opening or closing of the electromagnetic valve for steam show.

* * * * *